United States Patent Office 3,197,378
Patented July 27, 1965

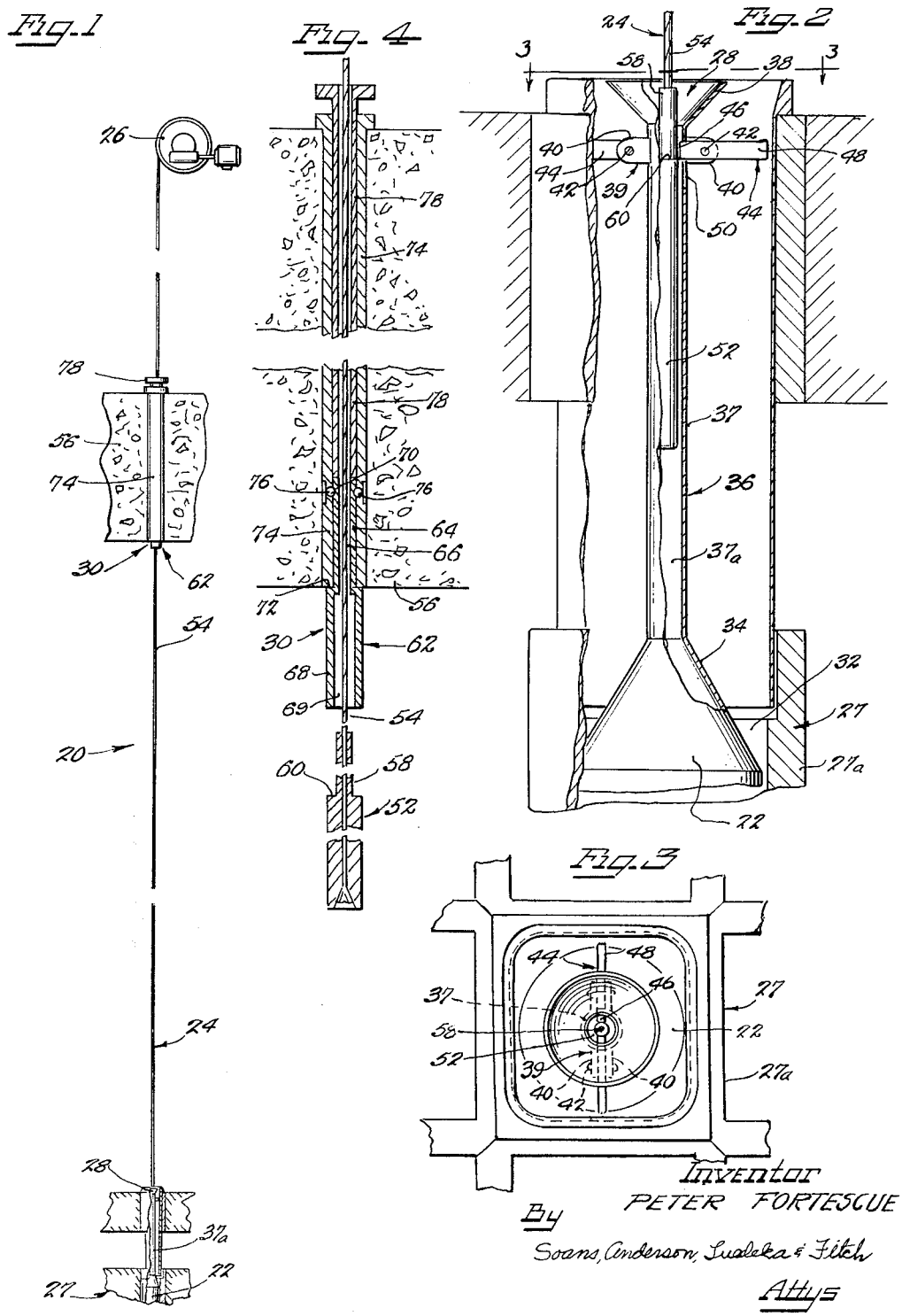

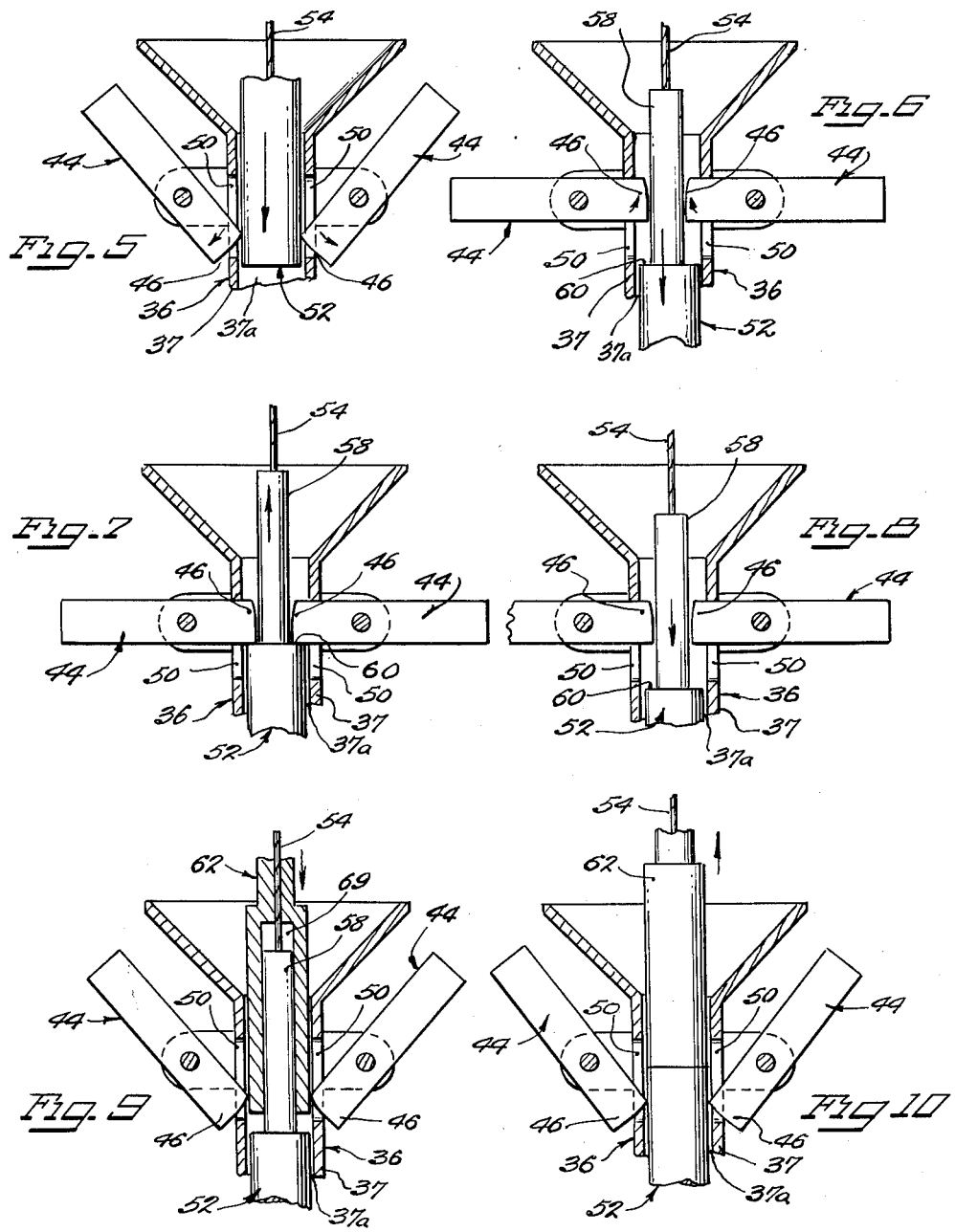

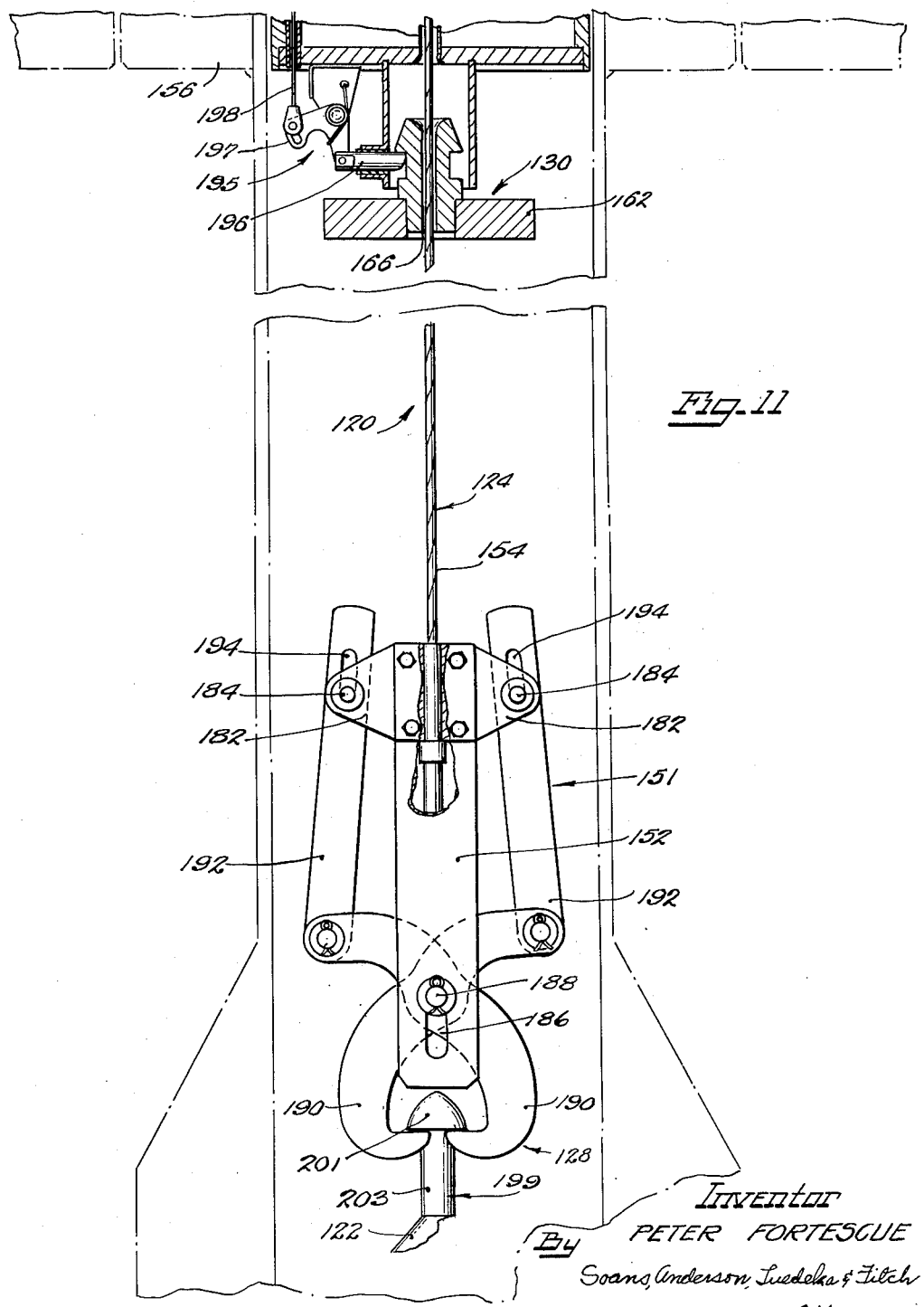

3,197,378
CONTROL ROD LIFT-COUPLING
MECHANISM
Peter Fortescue, Rancho Santa Fe, Calif., assignor to General Dynamics Corporation, New York, N.Y., a corporation of Delaware
Filed Nov. 8, 1961, Ser. No. 150,955
6 Claims. (Cl. 176—36)

This invention relates generally to a coupling mechanism, and more particularly to a mechanism for releasably coupling a lifting or regulating means to a movable element in a nuclear reactor.

A nuclear reactor generally includes a core containing fuel, i.e., fissionable material, which reacts to provide power. The power level is controlled by moving one or more control rods into and out of the core. Often, the control rods are suspended from above the core and merely raised out of or lowered back into the core to control the output of the reactor. As a safety factor, it is necessary that it be possible, if the need arises, to return the control rods to the core almost instantaneously. This instantaneous return, called scramming, is accomplished in a reactor where the control rods are suspended from above the core by dropping the rods back down into the core. As time is of the essence, and as it takes time to disconnect attachments, normally everything which is attached to the control rod drops along with it. While safety is of prime importance, it is also desirable to be able to connect and disconnect the control rod from the mechanism for raising and lowering it during ordinary operation of the reactor. Furthermore, it is desired that the coupling mechanism for this purpose be relatively simple in construction and operation. In particular, the more connections, wires, etc., which are utilized, the greater the initial cost, and also the greater the probability of malfunctioning somewhere along the line.

Accordingly, it is the prime object of this invention to provide an improved coupling mechanism. A further object is to provide a coupling mechanism which is particularly adapted to the handling of control rods in a nuclear reactor. Still another object is to provide a greatly simplified but effective coupling mechanism, which may be disconnected when desired, for use with a control rod in a nuclear reactor, the coupling mechanism operating in such a manner that when the control rod must be dropped in an emergency situation the minimum of associated equipment and movement is involved. Still another object is to provide a coupling mechanism of the type referred to above, which is incapable of disconnecting to release the control rod from a suspended position.

Various other objects and advantages of the present invention will become obvious from the following description and accompanying drawings.

In the drawings:

FIGURE 1 is a schematic view of a portion of the control apparatus for a nuclear reactor, which means embodies various features of the invention;

FIGURE 2 is an enlarged fragmentary view of the coupling mechanism used in the control apparatus shown in FIG. 1;

FIGURE 3 is a top plan view taken generally along line 3—3 of FIG. 2;

FIGURE 4 is an enlarged fragmentary, sectional view of the disconnecting means of the control apparatus shown in FIG. 1;

FIGURES 5 through 7 are further enlarged fragmentary views of the coupling mechanism illustrating steps in its connection;

FIGURES 8 through 10 are generally similar to FIGS. 5 through 7, illustrating the disconnection of the coupling mechanism; and FIGURE 11 is a side view of a portion of a modified embodiment of the present invention, with parts broken away and in section.

While the invention disclosed herein may be used in many different ways to provide a disconnectable coupling for a lift mechanism, it has particular advantages in connection with the control apparatus of a nuclear reactor, and it is therefore described and illustrated in that context.

The control apparatus 20 shown generally in FIG. 1 includes a control rod 22 which is supported within a reactor core 27. The apparatus 20 further includes a lift means 24 which may be connected to the rod 22, and suitable actuating means 26 for raising and lowering the lift means 24 to raise and lower the control rod 22 relative to its position within the reactor core. The parts of the coupling mechanism 28, which are located on the lift means 24 and on the control rod 22, interengage to provide a locked but releasable connection or coupling between the lift means 24 and the control rod 22. A disconnecting or uncoupling means 30 for disconnecting or uncoupling the coupling mechanism 28 is releasably suspended above the rod 22.

The coupling mechanism 28 may be readily disconnected only when the control rod 22 is at rest within the reactor core 27, the construction of the coupling mechanism 28 being such that the control rod cannot be accidentally dropped from a suspended position through any malfunctioning of the disconnecting means 30. There is no connection between the disconnecting means 30 and the coupling mechanism 28 which prevents relative motion therebetween, and therefore the control rod 22 may be instantly scrammed without the necessity of disengaging from or also dropping the disconnecting means 30.

As seen best in FIGS. 1 through 3, the control rod 22 is an elongated structure including neutron absorbing material. The rod 22 is disposed in an elongated vertically extending cavity 32 formed by separator plates 27a positioned within the reactive core 27. The cavity 32 has a generally square transverse cross-section which is slightly larger than that of the control rod 32 so as to receive the rod in sliding engagement. The reactor core 27 may be of any suitable construction, such as known to the art.

An elongated coupling receptacle element 36, which comprises a part of the coupling mechanism 28, is fixed to the upper end of the control rod 22 and extends upwardly therefrom. The coupling element 36 includes a center, elongated, vertical tubular portion 37 which has an elongated central passageway 37a. Connecting the lower end of the tubular portion 37 to the upper end of the control rod 22 is a downwardly flared funnel-shaped portion 34. An upwardly opening guide funnel portion 38 is provided at the upper end of the tubular portion 37. Immediately below the funnel portion 38, the tubular portion 36 is provided with a pair of opposite, outwardly extending brackets 39, each bracket being comprised of a pair of spaced ears 40. Pivotally mounted at the outer end of each bracket 39 and between its ears 40, as by means of a rivet 42, is an elongated, generally rectangular coupling link or latch 44 having an inner end 46 and a weighted outer end 48. Each link 44 is mounted intermediate its ends so that the weighted outer ends 48 tend to cause the links 44 to rotate in a direction which will raise the inner ends 46. The inner ends 46 extend into the passageway 37a through elongated vertical slots or apertures 50 in the element 36, and the upper edges of the inner ends 46 abut the upper ends of the apertures 50 to normally maintain the links 44 in generally horizontally extending positions. The apertures 50 are sufficiently deep to permit rotation of the links 44 so as to lower and withdraw the inner ends 46 of the links from the passageway 37a. The lower edges of the inner ends 46 are preferably substantially square, while the upper edges of said inner ends 46 are rounded.

An elongated, cylindrical, coupling bar element 52, which is the other part of the coupling mechanism 28, is connected to and suspended from the lift means 24 which is illustrated as an elongated flexible wire rope or cable 54. The coupling bar element 52 is adapted to be received within the coupling receptacle element 36 for establishing connection between the control rod 22 and the cable 54. The cable 54 extends upwardly the substantial distance between the reactor core 27 and a concrete shield 56 which extends across the top of the reactor vessel. The cable 54 passes through the shield 56, and its upper end is connected to suitable actuating means 26, which is operable to raise and lower the cable and the coupling bar element 52. The upper end 58 of the bar element 52 has a reduced diameter, thereby providing a ledge or shoulder 60 extending circumferentially about the bar element 52 adajacent its upper end.

The steps in the engagement of the coupling mechanism 28 are illustrated in FIGS. 5 through 7. By lowering the coupling bar element 52 into the coupling receptacle element 36, the inner ends 46 of the links 44 are revolved downwardly and outwardly through the apertures 50 and out of the passageway 37a (FIG. 5). When the bar element 52 is lowered sufficiently so that the shoulder 60 passes the squared parts of the inner ends 46 of the links 44, the inner ends 46 are thereby allowed to swing inwardly and upwardly to the position shown in FIG. 6. When the element bar 52 is then raised, the shoulder 60 engages the lower edge of the inner ends 46 of the links 44, as shown in FIG. 7. Further rotation of the links 44 is prevented by their engagement with the upper ends of the slotted apertures 50. Further raising of the bar 52 will serve to raise the control rod 22. By operating the actuating means, the control rod 22 may be raised or lowered as desired. So long as the control rod 22 is in an elevated position, the weight of the rod serves to lock the coupling mechanism 28 in connected condition. Specifically, the inner ends 46 of the links 44 are effectively wedged between the shoulders 60 and the upper ends of the apertures 50, respectively, to prevent downward rotation, even under pressure, of the inner ends 46 to disconnect the coupling bar element 52 from coupling receptacle element 36.

The disconnecting means 30, shown particularly in FIG. 4, comprises a weight or plunger 62 slidable along the cable 54 and detachably suspended from the underside of the concrete shield 56. The plunger 62 (see also FIG. 9) comprises a generally cylindrical upper section 64 having a central bore 66 to receive the cable 54, and a generally tubular, downwardly open lower section 68 having an axial passage or recess 69. The upper section 64 has a circumferential groove 70 adjacent its upper end. The lower section 68 has a larger outer diameter than does the upper section 64 so as to provide a circumferential shoulder 72 at the juncture therebetween. The upper section 64 of the plunger 62 is adapted to be received into the lower end of a tube or sleeve 74 which is preferably removably received in a circular hole extending through the concrete shield 56. The tube 74 is provided with a plurality of inwardly biased ball bearings 76 which engage the groove 70 in the upper section 64 of the plunger when the plunger is inserted upwardly into the tube 74. The plunger is thus releasably maintained in a suspended position. Insertion of the plunger is additionally limited by engagement of its shoulder 72 with the lower edge of the tube 74. A generally elongated tubular release pin 78 is disposed about the cable 54 and extends downwardly through the tube 74. By depressing the release pin 78, from the protected side of the concrete shield 56, the plunger 62 is forced downwardly and released from its engagement by the ball bearings 76.

As shown in FIGS. 8 through 10, the coupling mechanism 28 is disconnected by lowering the coupling bar element 52 a short additional distance after the control rod 22 is in position within the reactor core 27, releasing the plunger 62, and then raising the coupling bar element 52 upwardly out of the coupling receptacle element 36. Specifically, the control rod 22 is lowered until it comes to rest within the reactor core 27. Lowering the coupling bar element 52 a short additional increment, as shown in FIG. 8, will lower the shoulder 60 relative to the inner ends 46 of the links 44. When the plunger 62 is dropped down upon the inner ends 46 they now have room to pivot downwardly and outwardly, as shown in FIG. 9. The recess 69, which extends upwardly into the tubular lower section 68, is preferably slightly larger in diameter than the cylindrical upper end 58 of the bar element 52 so that there is a dash-pot action between the recess and the upper end 58 to prevent the plunger 62 from striking the links 44 with too much force. As seen in FIG. 9, the outer diameter of the lower section 68 of the plunger 62 is substantially equal to the larger diameter of the bar element 52 and the length of the recess 69 is at least equal to that of the upper end 58, so that the lower section 68 of the plunger forms a substantially continuous surface with the larger diameter of the bar element 52 when the plunger is seated on the element 52. When the coupling bar element 52 carrying the plunger 62 is raised upwardly, as shown in FIG. 10, the inner ends 46 of the links 44 abut the sides of the bar element 52, but do not interfere with its upward withdrawal.

As noted above, inadvertently dropping the plunger 62 when the control rod 22 is in an elevated position will not disconnect the locked coupling mechanism 28. Only after the control rod 22 comes to rest is there afforded the relative movement between the coupling bar element 52 and the coupling receptacle element 36, as described above, to set the coupling mechanism 28 so that the plunger 62 will serve to disconnect or uncouple it.

To reset the control apparatus 20 after the coupling mechanism 28 has been uncoupled or disconnected, the bar element 52 carrying the plunger 62 is raised upwardly to reposition the plunger in the suspended position with its groove 70 receiving the ball-bearings 76. With the plunger thus again supported in its upper position, the cable 54 can be lowered to again connect or couple the coupling bar element 52 to the control rod.

Thus, a single connection (the cable) serves to connect the control rod to the operating station located on the other side of the shield. There is no direct attachment, either temporarily or permanently, between the coupling mechanism 28 or the control rod 22 and the disconnecting means 30. When the control rod is dropped in an emergency, the cable 54 merely slides downwardly relative to the plunger 62, lowering the rod. The disconnecting means 30 stays where it is, out of the way, and requiring no mechanism to disconnect or to drop it with the control rod.

Thus, a simple and safe, yet effective and advantageous apparatus is provided for connecting to, controlling the movement of, and disconnecting from a movable member.

The modified embodiment shown in FIG. 11 comprises a control apparatus 120 which includes lift means 124 which is connectable with a control rod 122 through a coupling mechanism 128. Disconnecting means 130 are also provided. The control means 120 is similar in various respects to control means 20, and in particular, it embodies a remotely controlled, single cable connection similar to that provided by control means 20. Control means 120 further incorporates the safety feature whereby the disconnecting means 130 will disconnect the coupling mechanism 128 only when the control rod 122 is in the rest position.

The lift means 124 of this embodiment comprises an elongated flexible wire rope or cable 154 which suspends at its lower end a gripping mechanism 151, comprising part of the coupling mechanism 128. The cable 154 is secured at its upped end to a suitable actuating means, such as a power-driven drum. The gripping mechanism 151 includes a bar element 152 which has a pair of outwardly extending brackets 182 at its upper end, each bracket 182 supporting an upper pivot pin 184. Centrally of the bar 152 at its lower end is a lower vertical slot 186. Received within the slot 186 for vertical movement is a lower pivot pin 188 which pivotally connects together, in an X configuration, a pair of generally elongated jaws or grippers 190. The jaws 190 are turned inwardly at their lower ends and each is pivotally connected at its upper end to the lower end, respectively, of an extension bar 192. The upper end of the extension bars 192 each have an upper vertical slot 194 which receives one of the two upper pivot pins 184 for vertical sliding engagement therebetween. Suitable means such as washers and cotter pins are provided to maintain the pivot pins 184 and 188 within the respective slots 194 and 186. The other part of the coupling mechanism 128 is provided by a coupling element 199 which includes an enlarged cam knob 201 mounted at the upper end of a vertical shaft 203 fixed atop the control rod 122. The jaws 190 engage the knob 201 to connect together the elements 152 and 199.

The disconnecting means 130 shown in FIG. 11 comprises a weight 162 which has a center bore 166 through which the cable 154 is slidably received. Suitable releasable holding means 195 are provided for maintaining the weight 162 suspended at an elevated position. The holding means 195 comprises generally a latch 196 which is pivotally connected to one leg of an L-shaped link 197 that is pivotally mounted to the underside of the reactor shield 156. The other leg of the link 197 is connected to a cable 198 which passes through the shield 156. By pulling the cable 198, the link 197 is pivoted and the latch 196 is disengaged from the weight 162, allowing it to drop.

When the bar element 152 is lowered, by means of the cable 154 and the actuating means, the jaws 190 engage the cam knob 201 of the element 199. Initially, the downward movement of the jaws 190 and the extension bars 192 is retarded so that the bar element 152 moves relative to the jaws and extension bars (by virtue of the sliding movement of the pins 184 and 188 within the slots 194 and 186). When the pin 188 engages the upper end of the lower slot 186, further downward movement of the bar element 162 causes the jaws 190 to be pivoted open so that they may move downwardly past the cam knob 201. The weight of the jaws 190 then cause them to close inwardly against the shaft 203 of the element 199. When the bar element 152 is subsequently raised upwardly, the jaws 190 engage the under portion of the cam knob 201, serving to raise the control rod 122.

As with the principal embodiment, the release of the weight 162 while the control rod 122 is thus suspended is ineffective to release the locking engagement of the coupling mechanism 128. The locking engagement may be released only by first lowering the control rod 122 to its rest position in the core. Further downward movement of the bar element 152 causes the bar element to move downwardly relative to the jaws 190 and extension bars 192. Release of the weight 162 when the coupling mechanism 128 is in this position will serve to disconnect the elements of the coupling mechanism 128. Specifically, the weight 162 is dropped by pulling the cable 198. The weight 162 engages the upper ends of the extension bars 192, driving them downwardly relative to the bar element 152, and thus causing the jaws 190 to pivot to an open position. The weight 162 maintains the jaws 190 in this open position when the bar element 152 is subsequently raised, thus effectuating the disconnection of the elements of the coupling mechanism 128.

To reset the disconnecting means 130, the bar element 152 with the weight 162 atop it is raised until the weight 162 reengages the latch 196 of the holding means 195.

Various changes and modifications, in addition to those already discussed, may be made without departing from the spirit and scope of the present invention as defined by the following claims.

What is claimed is:

1. A coupling mechanism for effecting the releasable attachment of an elongated lifting member to an article that is to be lowered to and raised from a supported rest position by the lifting member, which coupling mechanism comprises a pair of coupling elements adapted to be joined in mating relationship, one of said coupling elements being secured to the article and the other of said coupling elements being secured to the lower end of the elongated lifting member, at least one linking member, said linking member being secured to one of said coupling elements so that the linking member is moved into engagement with the other of said coupling elements so as to effect the releasable attachment of said coupling elements to each other when said coupling element secured to the elongated lifting member is advanced into mating relationship with said coupling element secured to the article, and disengaging means mounted for selective movement along said elongated lifting member and into engagement with said linking member whereby said linking member is moved to allow the said coupling elements to be separated.

2. A coupling mechanism for effecting the releasable attachment of an elongated lifting member to an article that is to be lowered to and raised from a supported rest position by the lifting member, which coupling mechanism comprises a pair of coupling elements adapted to be joined in mating relationship, one of said coupling elements being a receptacle that is secured to the article and defines an open ended passageway, the other of said coupling elements being a cylindrical member that is secured to the lifting member and is proportioned to fit within the passageway defined by said receptacle, at least one linking member secured to said passageway defining receptacle so that the linking member is moved into engagement with the other of said coupling elements so as to effect the releasable attachment of said coupling elements to each other when said coupling element secured to the elongated lifting member is advanced into mating relationship with said coupling element secured to the article, and disengaging means mounted for selective movement along said elongated lifting member and into engagement with said linking member whereby said linking member is moved to allow the said coupling elements to be separated.

3. A coupling mechanism for effecting the releasable attachment of an elongated lifting member to an article that is to be lowered to and raised from a supported rest position by the lifting member, which coupling mechanism comprises a pair of coupling elements adapted to be joined in mating relationship, one of said coupling elements being a receptacle that is secured to the article and defines an open-ended passageway, the other of said coupling elements being a cylindrical member having an upper portion of reduced cross-section that is secured to the lifting member, said cylindrical member being proportioned to fit within the passageway defined by said receptacle upon lowering of the lifting member, at least one linking member pivotally secured to said passageway defining receptacle so that the movement of the cylindrical coupling element into said passageway causes the pivoting of said linking member until the upper portion of reduced cross-section is aligned with said linking member to allow the return pivoting thereof into a locking position whereby the upward movement of the cylindrical coupling element is thereafter precluded, and a cylindrical disengaging member that has an outer diameter substantially equal to the diameter of the cylindrical coupling member and is provided with a central bore that is proportioned to receive the portion of the cylindrical coupling member having the reduced cross-section so that upon movement of said cylindrical coupling member below said linking member the cylindrical disengaging member can effect the pivoting of said linking member out of engaging relation with the cylindrical coupling member.

4. A coupling mechanism for effecting the releasable attachment of a lifting cable to an elongated control rod that is to be lowered to and raised from a supported rest position with the core of a nuclear reactor, which coupling mechanism comprises a pair of cooperating coupling elements one of said coupling elements being connected to the lower end of the lifting cable and the other of said coupling elements being connected to the control rod, at least one of said coupling elements including a linking member that is secured thereto to effect the releasable interconnection of said coupling elements and thereby connect the cable to the control rod, a disconnecting member disposed along the cable in a manner affording sliding movement relative thereto, and means for releasably supporting said disconnecting member at a position spaced sufficiently above the core to allow space for the control rod to be withdrawn from said core without interference from said disconnecting member, said disconnecting member being movable into engagement with said linking member to disconnect said coupling elements upon release from said support means.

5. A coupling mechanism for effecting the releasable attachment of a lifting cable to an elongated control rod that is to be lowered to and raised from a supported rest position with the core of a nuclear reactor, which coupling mechanism comprises a knob element connected to the upper end of the control rod, a releasable grapple connected to the lower end of the cable and adapted to engage said knob element to thereby connect the cable to the control rod; said grapple including a center bar element, a pair of side elements connected to said center element for vertical movement relative thereto and a pair of jaw elements pivotally connected together in an X configuration and supported on said center element for vertical movement relative thereto; the upper end of each jaw element being piovtally connected to one of said respective side elements; a disconnecting member disposed along the cable in a manner affording sliding movement relative thereto; and means for releasably supporting said disconnecting member at a position spaced sufficiently above the core to allow space for the control rod to be withdrawn from said core without interference from said disconnecting member; said disconnecting member being movable upon release from said support means into engagement with said side elements to effect opening of said jaw elements whereby said grapple is disconnected from said knob element.

6. A coupling mechanism for effecting the releasable attachment of an elongated lifting member to an article that is to be lowered to and raised from a supported rest position by the lifting member, which coupling mechanism comprises a pair of coupling elements adapted to be joined in mating relationship, one of said coupling elements being a hollow receptacle that is secured to the article and defines an open-ended passageway, the other of said coupling elements being a cylindrical member having an upper portion of reduced cross-section that is secured to the lifting member, said cylindrical member being proportioned to fit within the passageway defined by said receptacle upon lowering of the lifting member, said receptacle having at least one aperture provided therein communicating with the passageway defined thereby and a mounting member secured thereto adjacent said aperture, at least one linking member pivotally secured to said mounting member and having one end thereof passing through said aperture and into said passageway substantially perpendicular to the axis thereof, said linking member being mounted so that downward pivotal movement of the end portion extending into said passageway can be effected by downward movement of the cylindrical coupling element into said passageway and so that upward pivotal movement thereof is precluded, said cylindrical coupling element maintaining said linking member in a pivoted position until the upper portion of reduced cross-section is aligned with said linking member to allow the return pivoting thereof into a locking position whereby the upward movement of the cylindrical coupling element relative to said receptacle is thereafter precluded, and a cylindrical disengaging member that has an outer diameter substantially equal to the diameter of the cylindrical coupling member and is provided with a central bore that is proportioned to receive the portion of the cylindrical coupling member having the reduced cross-section so that upon movement of said cylindrical coupling member below said linking member the cylindrical disengaging member can effect the pivoting of said linking member out of engaging relation with the cylindrical coupling member.

References Cited by the Examiner

UNITED STATES PATENTS

| | | | |
|---|---|---|---|
| 1,092,508 | 4/14 | Robinson | 166—215 |
| 2,830,669 | 7/45 | Mowrey | 166—214 |
| 2,885,007 | 5/59 | Hoffer | 166—214 |
| 2,894,779 | 7/59 | Kushner | 294—83 |
| 3,036,964 | 5/62 | Horning | 176—33 |

CARL D. QUARFORTH, *Primary Examiner.*

REUBEN EPSTEIN, *Examiner.*

UNITED STATES PATENT OFFICE
CERTIFICATE OF CORRECTION

Patent No. 3,197,378 July 27, 1965

Peter Fortescue

It is hereby certified that error appears in the above numbered patent requiring correction and that the said Letters Patent should read as corrected below.

Column 1, line 50, before "disconnecting" insert -- accidentally --; column 2, line 38, for "reactive" read -- reactor --; column 5, line 46, for "162" read -- 152 --; column 8, line 46, for "2,830,669" read -- 2,380,669 --.

Signed and sealed this 5th day of April 1966.

(SEAL)
Attest:

ERNEST W. SWIDER
Attesting Officer

EDWARD J. BRENNER
Commissioner of Patents